April 3, 1962          J. L. COVERT          3,028,481
METHOD AND APPARATUS FOR MAKING WELDED HONEYCOMB
Filed Aug. 26, 1960          12 Sheets-Sheet 1
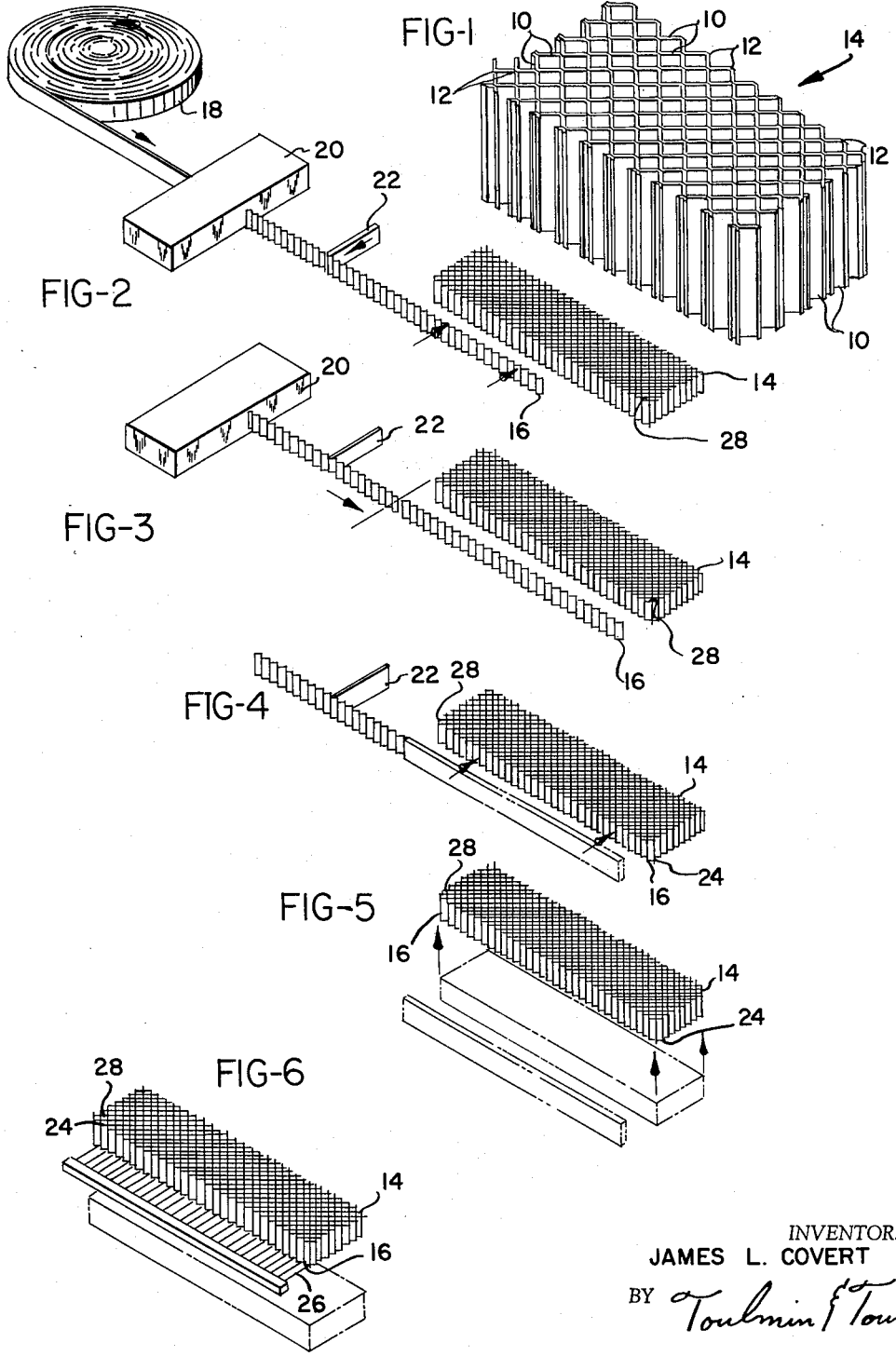
INVENTOR.
JAMES L. COVERT
ATTORNEYS

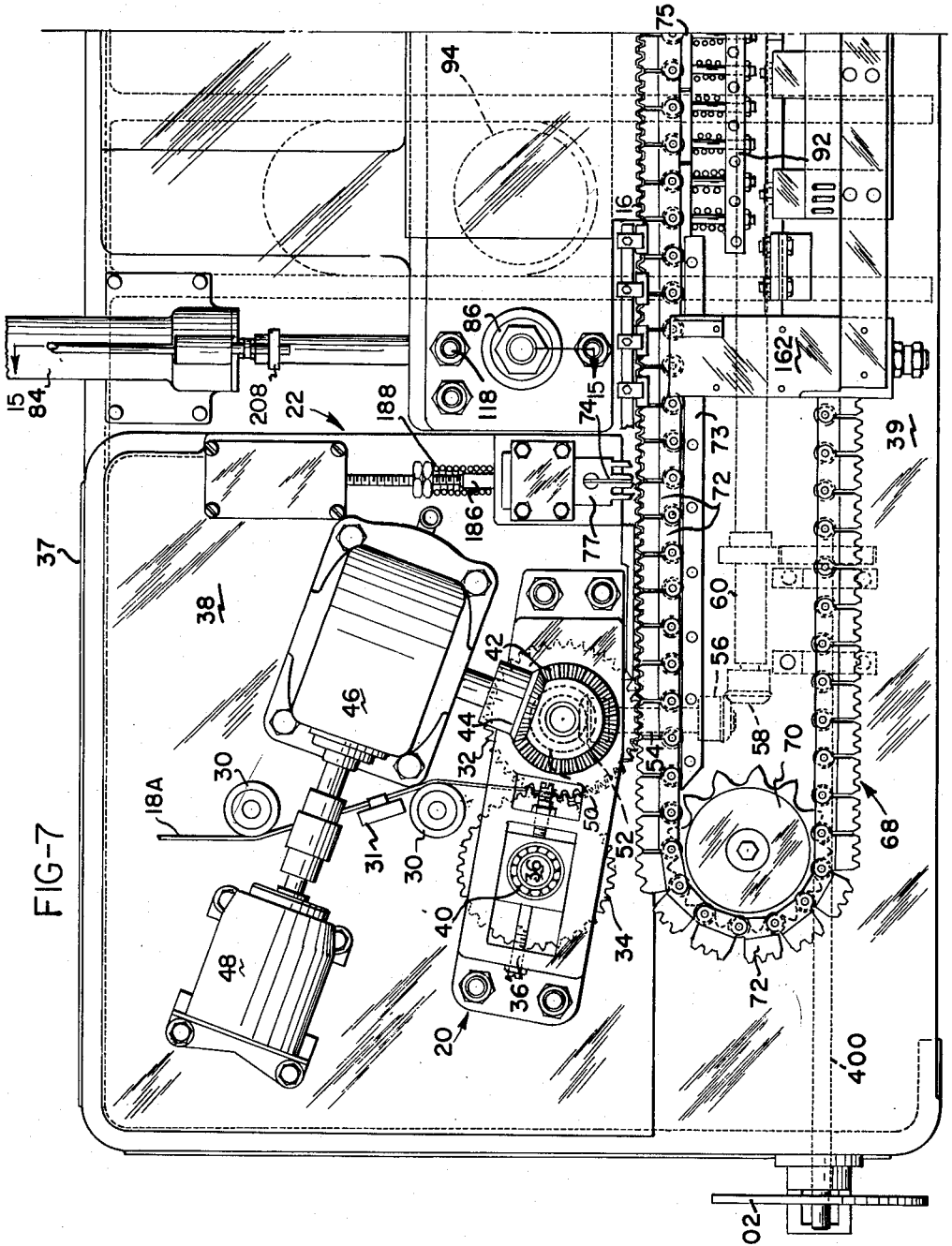

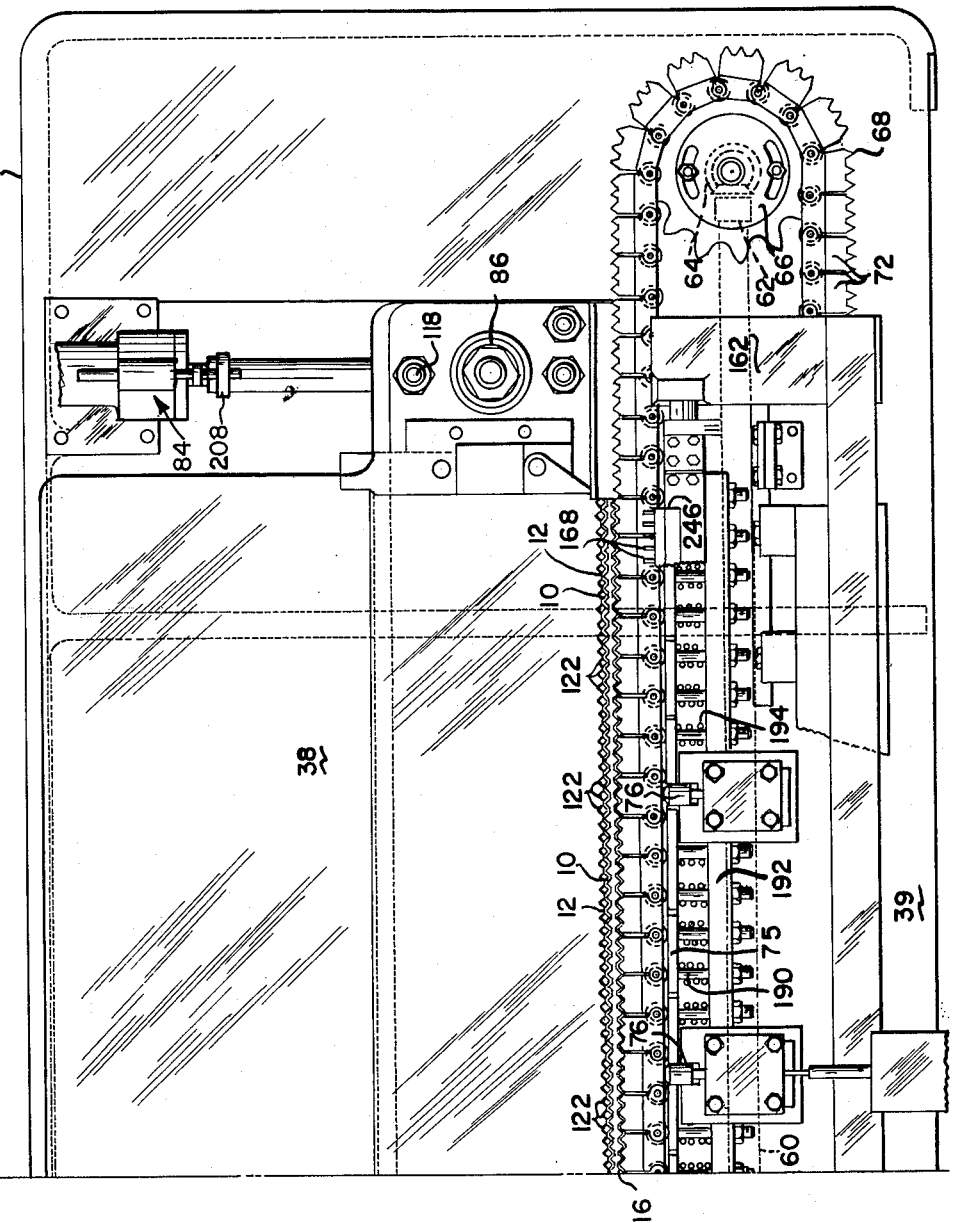

April 3, 1962   J. L. COVERT   3,028,481
METHOD AND APPARATUS FOR MAKING WELDED HONEYCOMB
Filed Aug. 26, 1960   12 Sheets-Sheet 4
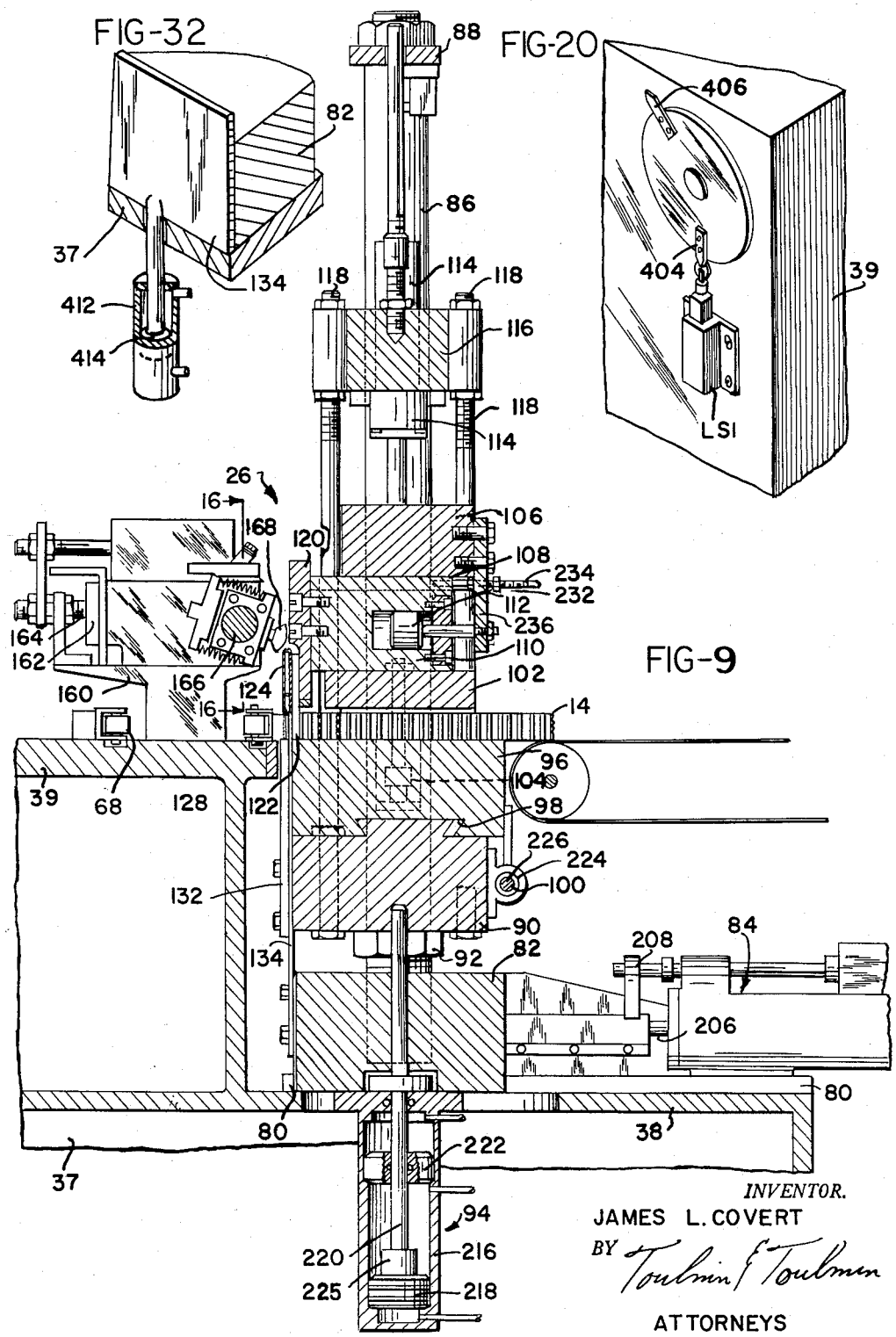
INVENTOR.
JAMES L. COVERT
BY
ATTORNEYS

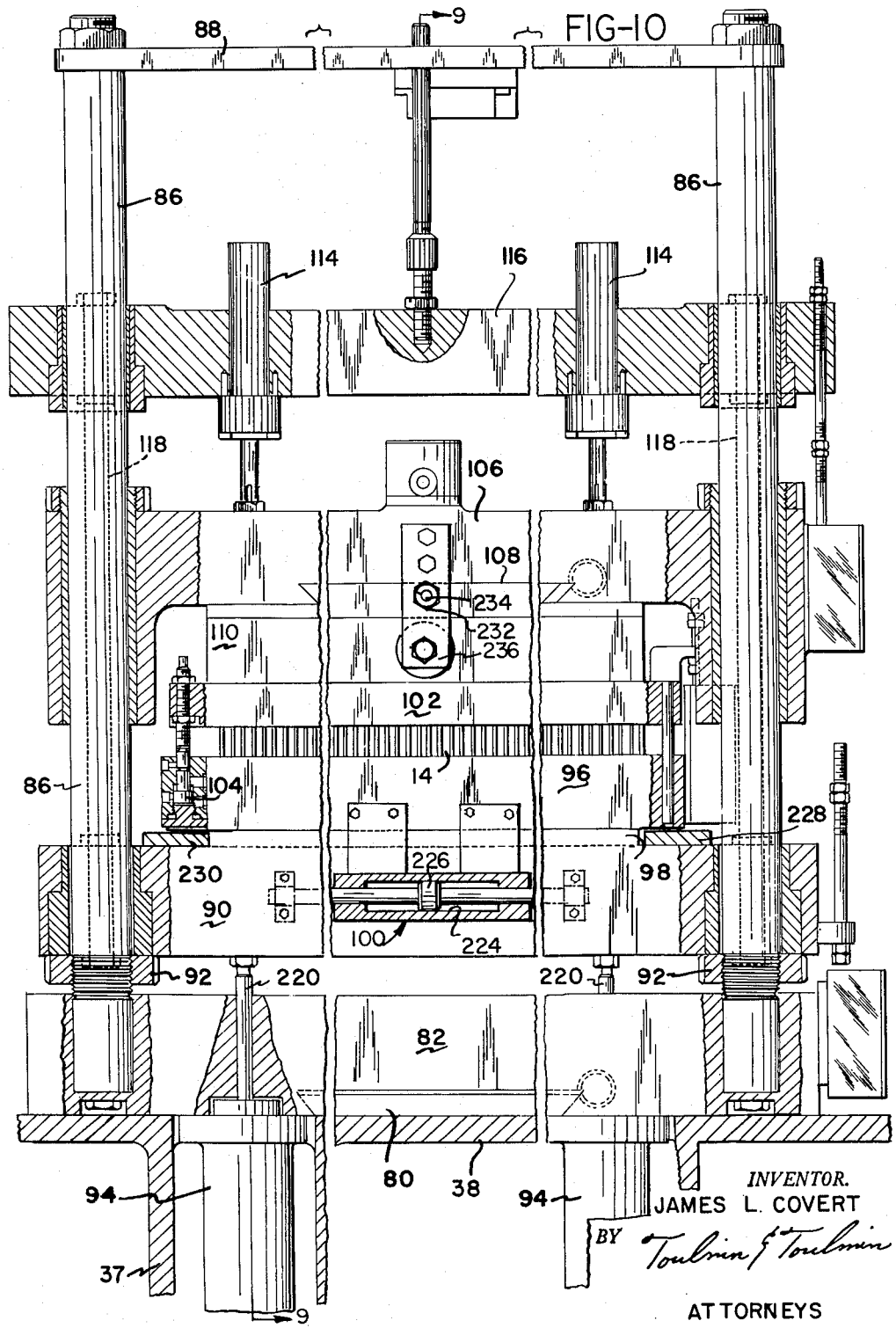

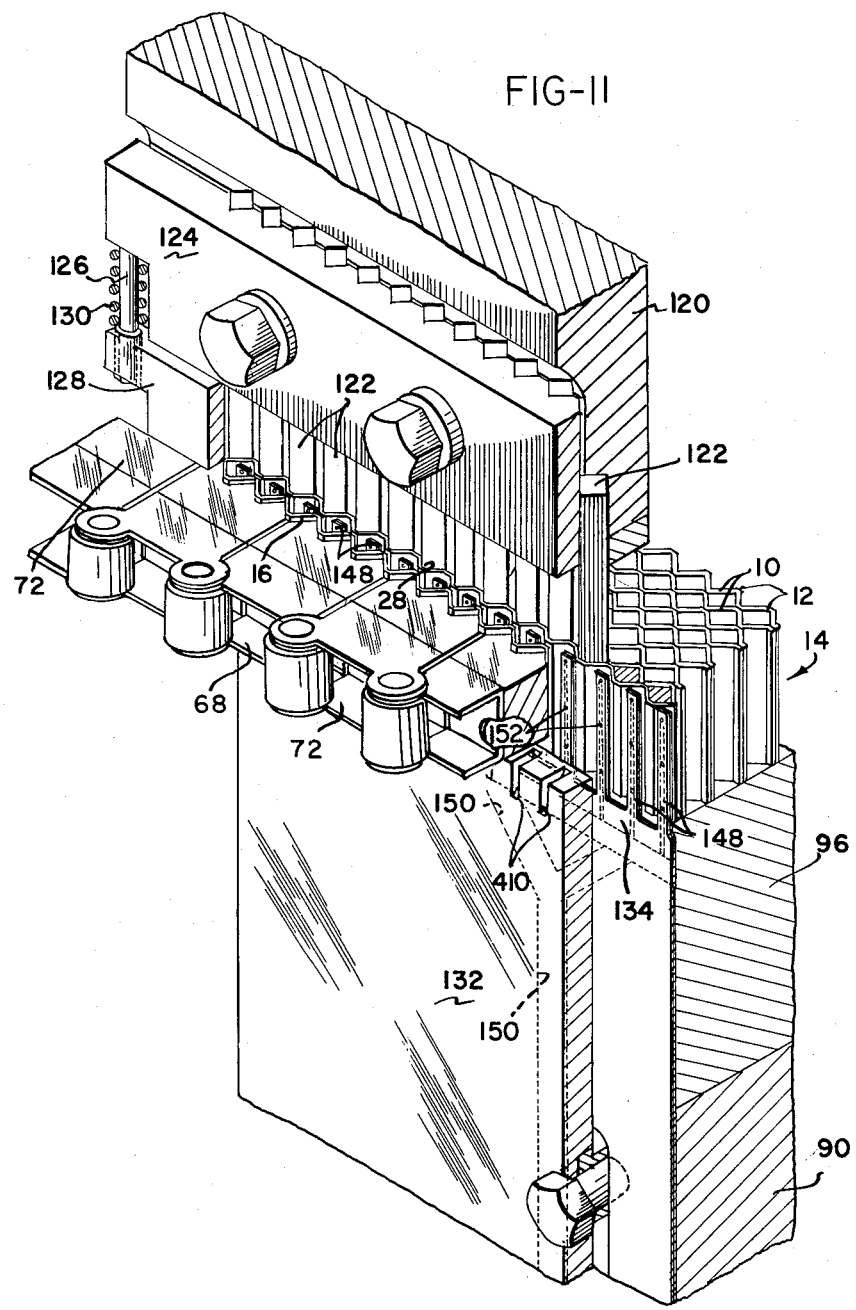

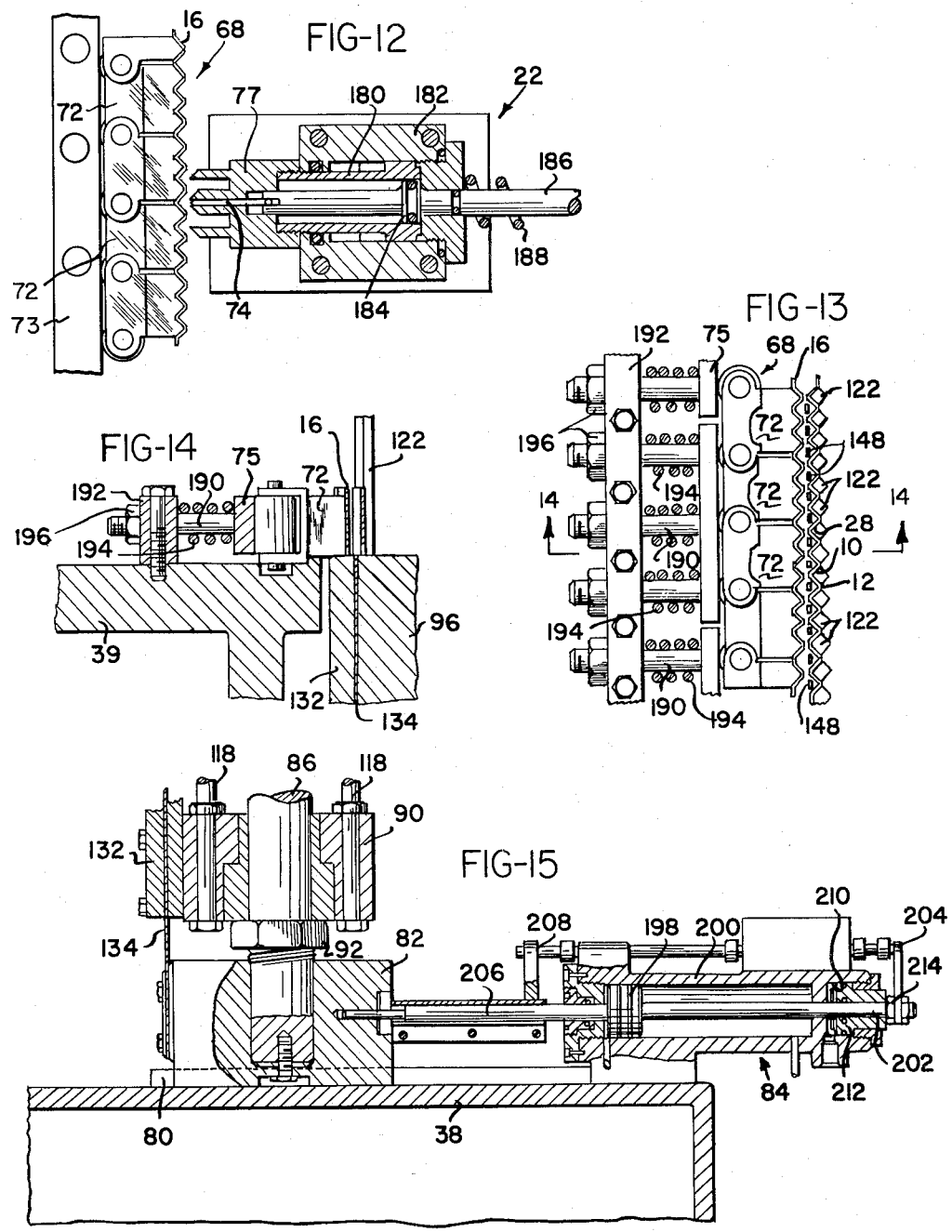

April 3, 1962     J. L. COVERT     3,028,481
METHOD AND APPARATUS FOR MAKING WELDED HONEYCOMB
Filed Aug. 26, 1960     12 Sheets-Sheet 8
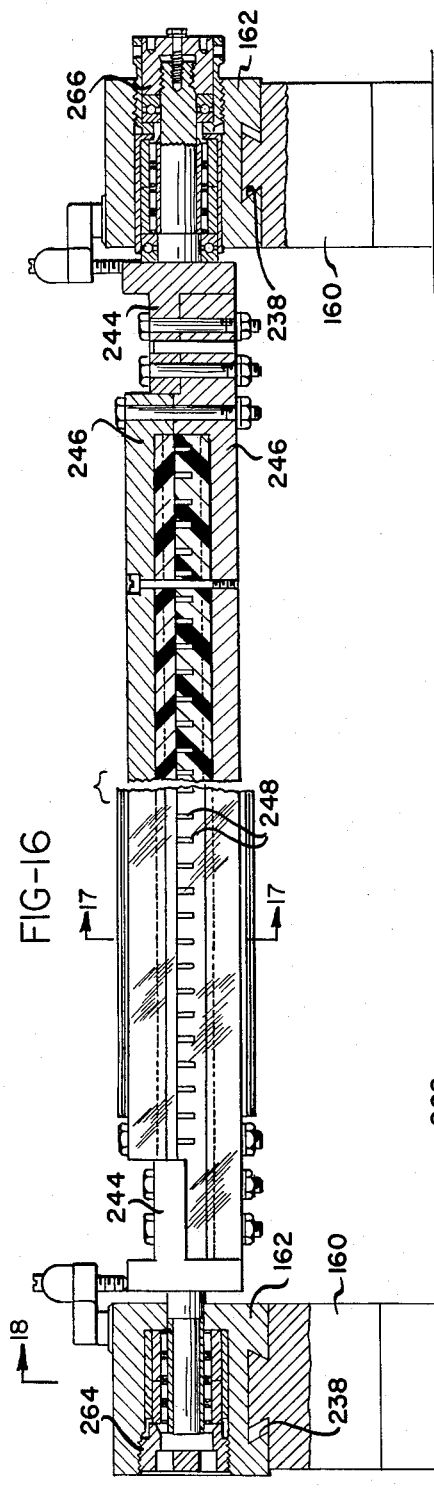
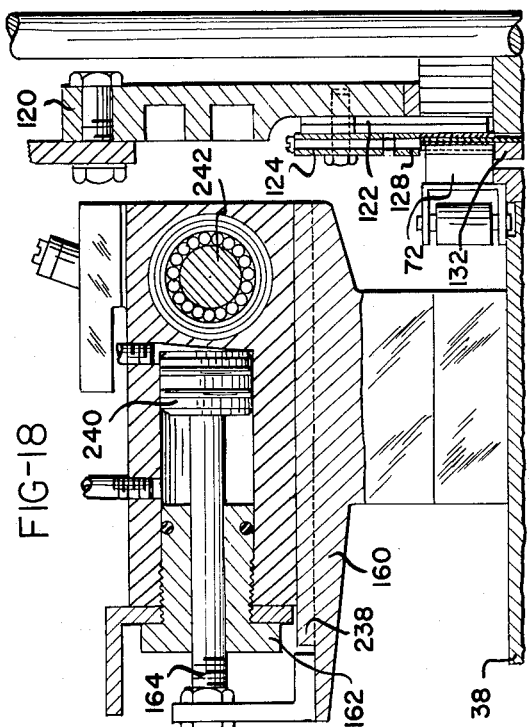
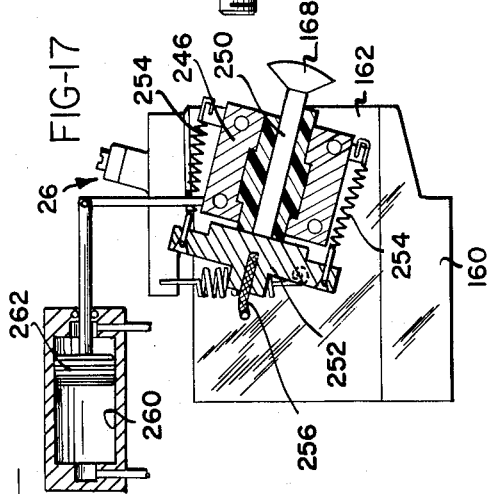
INVENTOR.
JAMES L. COVERT
BY Toulmin & Toulmin
ATTORNEYS

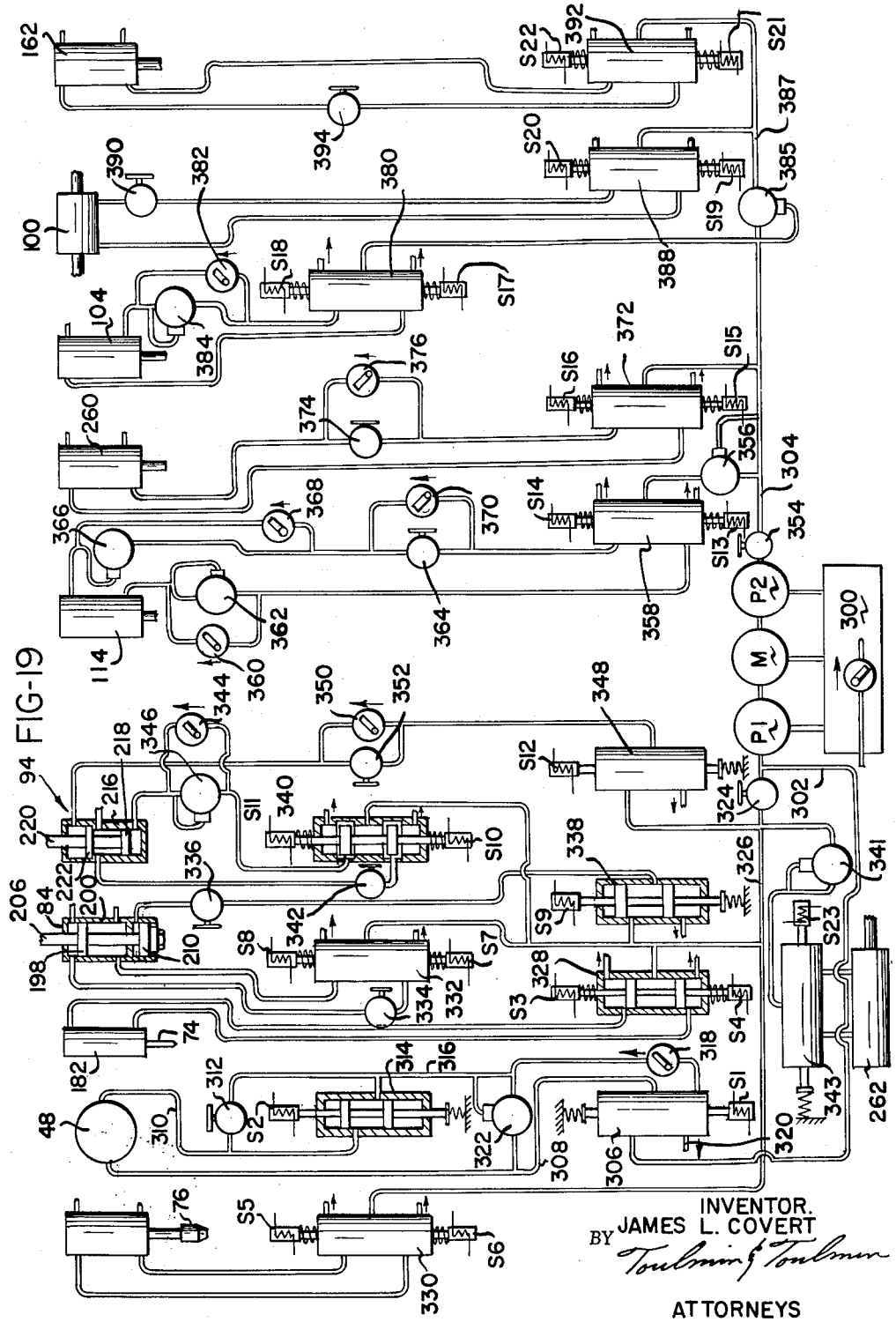

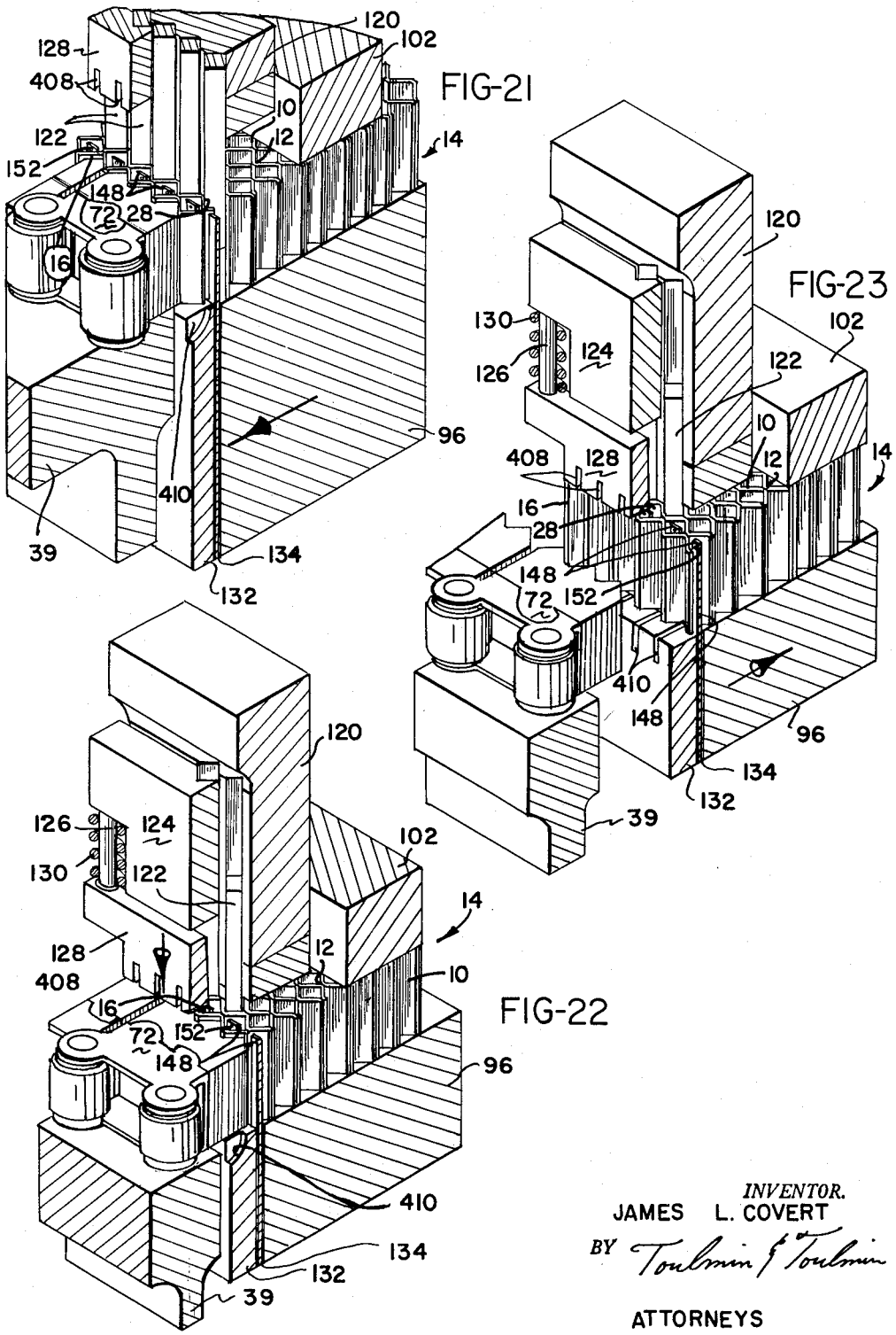

April 3, 1962   J. L. COVERT   3,028,481
METHOD AND APPARATUS FOR MAKING WELDED HONEYCOMB
Filed Aug. 26, 1960   12 Sheets-Sheet 11
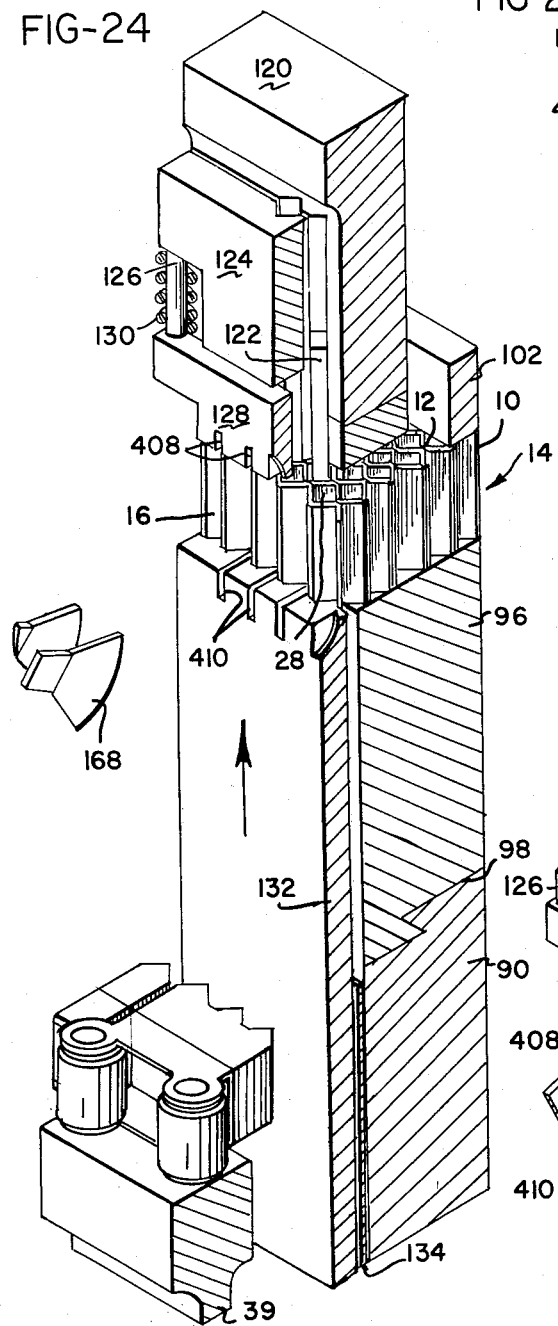
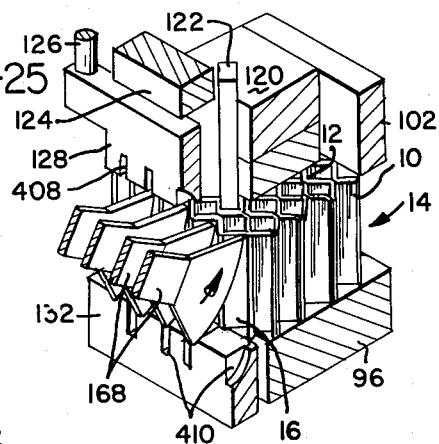
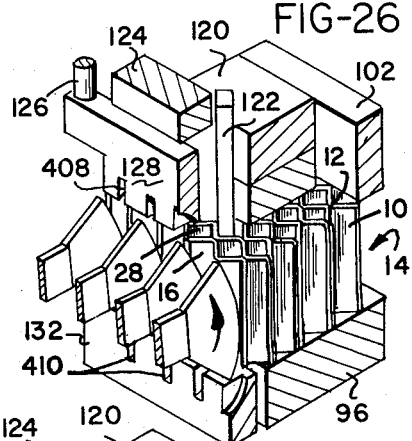
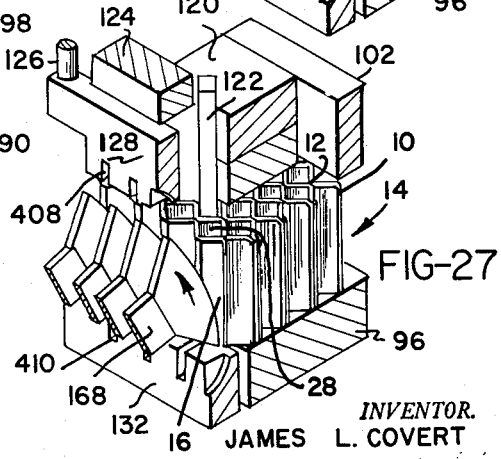
INVENTOR.
JAMES L. COVERT
BY Toulmin & Toulmin
ATTORNEYS

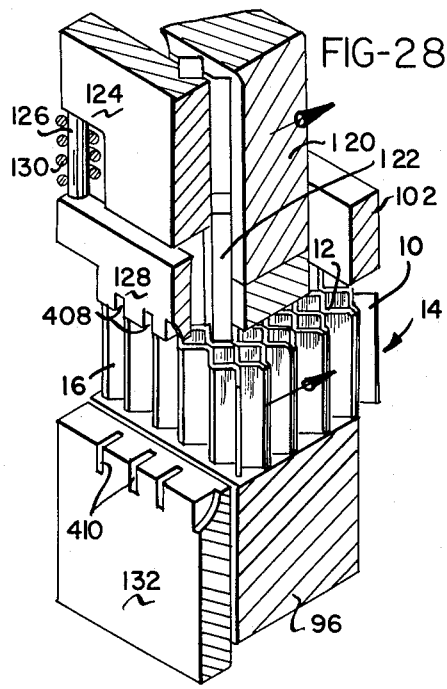
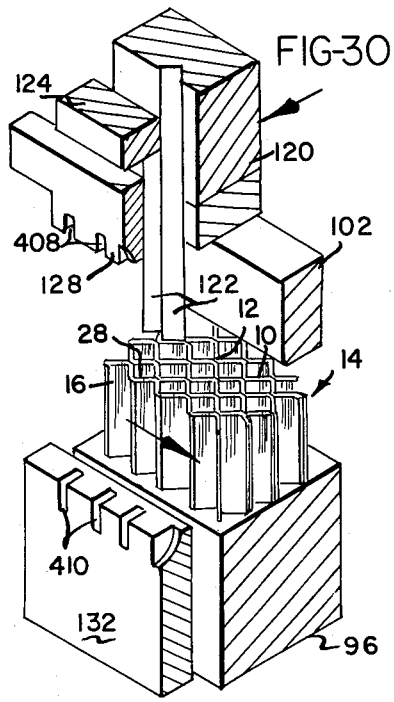
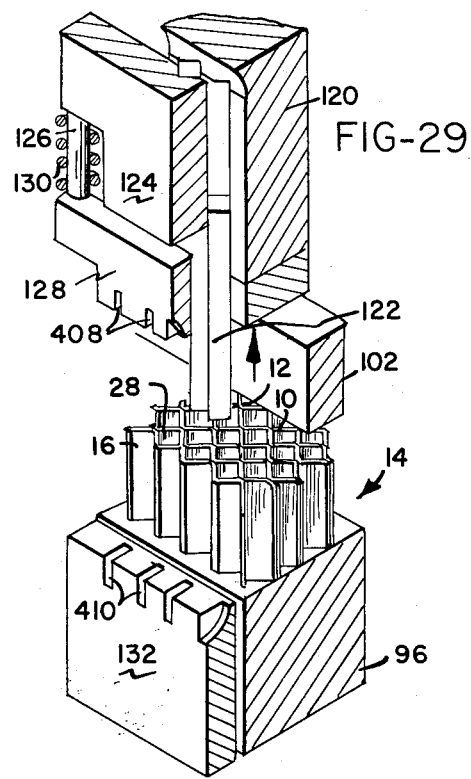
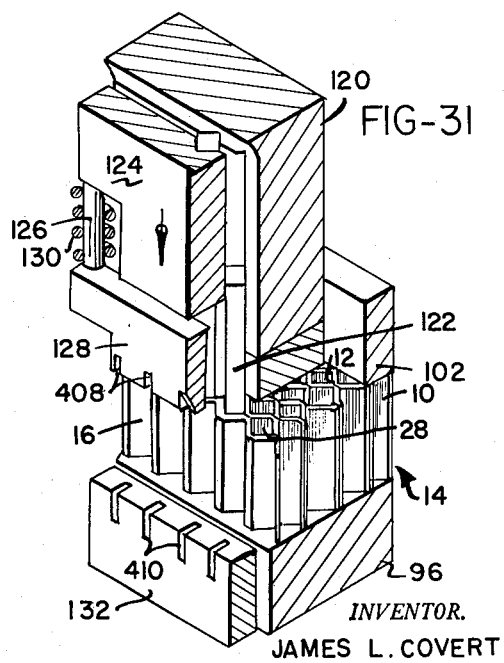

United States Patent Office 3,028,481
Patented Apr. 3, 1962

3,028,481
METHOD AND APPARATUS FOR MAKING WELDED HONEYCOMB
James L. Covert, Louisville, Ky., assignor to Kentucky Metal Products Company, Louisville, Ky., a partnership
Filed Aug. 26, 1960, Ser. No. 52,281
33 Claims. (Cl. 219—80)

This invention relates to a method and apparatus for forming welded honeycomb structures and particularly to such a method and apparatus characterized in producing welded honeycomb structures at high speed.

Honeycomb structures are well known and in the past have been constructed of thin strips or sheets of paper, or metal or plastic impregnated fabrics, or the like, generally with the individual strips making up the honeycomb being secured together by adhesives.

Even metal honeycomb structures have been constructed utilizing adhesive to connect adjacent strips of the honeycomb together.

A honeycomb of this nature is an extremely strong, light member and thus has come into wide usage as a structural material and has recently been used in connection with rockets and jet engines and the like.

In use of the honeycomb for jet engines or rockets and similar situations where high temperatures are encountered, it is found that an adhesively bonded honeycomb is unsatisfactory. No adhesive has been developed that will withstand the high temperatures while maintaining an adequate structural bond between the individual strips of the honeycomb. This situation has led to the requirement for the individual strips of the honeycomb to be welded together whereby the honeycomb becomes an integral work member.

The welding of honeycomb structures of this nature is difficult because the individual cells are sometimes quite small, down to ⅛" or so and because the strips making up the honeycomb are quite thin, only 2 or 3 thousandths of an inch thick in some cases.

During welding great care must be taken not to burn the strips, and also the regions where the strips are welded must be adequately supported or else the cells of the honeycomb behind the weld lines will collapse.

It has been found not too difficult to weld the strips together to make up a honeycomb where the welding is carried out one weld at a time and with the operation being performed largely manually.

This sort of operation, however, is slow and expensive and as a result the production of welded honeycomb structures is a slow and expensive process.

The present invention has as a primary object the provision of a method and apparatus whereby welded honeycombs can be produced rapidly and efficiently.

A particular object of this invention is to provide a method and apparatus for forming a honeycomb structure that will be welded in which a multiplicity of welds are accomplished at one time thereby greatly speeding up the welding process.

A still further object of this invention is the provision of a method and apparatus for producing welded honeycombs from extremely thin strips in which all manual operations in connection with the feeding and forming and placing of the strips and the welding thereof to the honeycomb are eliminated.

A still further object of this invention is the provision of a method and apparatus for forming welded honeycombs which is adaptable to honeycombs of various thickness and width.

Still another object of this invention is the provision of a method and apparatus for forming welded honeycombs in which superior welds are had and wherein the welds are accomplished in multiple.

Another object of this invention is the provision of an apparatus for producing welded honeycombs in which the apparatus can readily be serviced and which apparatus is basically simple in construction and direct acting.

FIGURE 1 is a perspective view showing a section of welded honeycomb;

FIGURES 2 through 6 are diagrammatic views showing various steps in the process of making honeycomb according to this invention;

FIGURE 7 is a plan view of the left side of a machine for making honeycomb according to this invention;

FIGURE 8 is a plan view of the right side thereof;

FIGURE 9 is a vertical sectional view through the machine and is indicated by line 9—9 on FIGURE 10;

FIGURE 10 is a rear elevational view of the machine;

FIGURE 11 is a perspective view drawn at enlarged scale taken at the front of the machine showing the transfer rack and the baffle and the body of honeycomb to which the strip on the transfer rack is to be attached;

FIGURE 12 is a sectional view through the clamp and knives at the cut off station;

FIGURE 13 is a fragmentary plan view showing an arrangement for resiliently backing up the transfer rack;

FIGURE 14 is a sectional view indicated by line 14—14 on FIGURE 13.

FIGURE 15 is a sectional view taken on line 15—15 of FIGURE 7 showing the motor arrangement which feeds the honeycomb into the new strip.

FIGURE 16 is a sectional view indicated by line 16—16 on FIGURE 9 showing the electrode support for supporting the electrodes that weld the new strip to the honeycomb;

FIGURE 17 is a sectional view indicated by line 17—17 on FIGURE 16 showing more in detail the manner in which the electrodes are carried on their support;

FIGURE 18 is a view taken on line 18—18 on FIGURE 16 showing one of the motors for actuating the electrode support toward and away from the honeycomb;

FIGURE 19 is a diagrammatic representation of a hydraulic control circuit for actuating the apparatus;

FIGURE 20 is a perspective view showing a cam by means of which the operation of the machine is controlled;

FIGURE 21 is a perspective view showing the body of honeycomb being fed into engagement with the new strip;

FIGURE 22 is a view like FIGURE 21 but shows the new strip being clamped to the honeycomb;

FIGURE 23 is a perspective view showing the honeycomb with the new strip clamped thereto being retracted from the transfer rack;

FIGURE 24 is a perspective view showing the honeycomb and new strip elevated into alignment with the welding electrodes;

FIGURES 25, 26 and 27 are perspective views showing different stages in the welding operation;

FIGURE 28 illustrates the honeycomb with the new strip attached thereto being retracted from welding position;

FIGURE 29 shows the welding fingers being withdrawn from the honeycomb;

FIGURE 30 shows the honeycomb together with the new strip being shifted laterally to bring the new row of cells thereon into alignment with the welding fingers and the welding fingers being returned to their initial position;

FIGURE 31 illustrates the welding fingers again being introduced into the outermost row of cells of the honeycomb preparatory to the initiation of a new cycle; and FIGURE 32 is a perspective view showing the manner in which a motor can be connected to the baffle member for moving it into and out of operative position.

Referring to the drawings somewhat more in detail, FIGURE 1 illustrates a fragment of welded honeycomb constructed according to the present invention.

The honeycomb comprises a plurality of corrugated strips 10 which are so formed as to have narrow flat areas at 12 extending transversely of the strip which may be referred to as nodes which abut the nodes of the next adjacent strip. Each strip is offset from the adjacent strips by a ½ pitch and accordingly, when the abutting nodes 12 are secured together, a honeycomb structure results.

The individual strips may be quite thin, say from two thousandths of an inch thick upwardly and may be of substantially any width, from, say, ½" to 3 or 4". There is substantially no limit that must be imposed on the width of a honeycomb of this nature, although a width from 6 to 12' is generally sufficient for most purposes. The length of the honeycomb in a direction at right angles to the strips 10 is, of course, without limit.

According to this invention the abutting nodes 12 are welded together so that the strips 10 are integrally united and are thus able to withstand considerable physical abuse and any temperatures that would be encountered below the melting point of the metal of the strips and which usually is stainless steel.

An important consideration in connection with welding the nodes 12 together is that they must be welded throughout their lengths from the top to the bottom of the honeycomb.

The various steps in the production of honeycomb according to the present invention are diagrammatically illustrated in FIGURES 2 through 6.

In these figures a portion of built-up honeycomb is indicated at 14 and further building up of the honeycomb is accomplished by adding thereto, one by one, individual corrugated strips 16 which are obtained by feeding strip material of the proper width and thickness from a reel 18 through a crimping or forming station 20 wherein the strip is formed to its corrugated configuration.

This can readily be accomplished by properly formed gear-like members running together. The strips which emerge from the crimping or forming station 20 are cut off at a cut off station 22 which severs the strip 16 at the proper point to give a piece of the proper length.

Strip 16, as will be seen in FIGURE 3 is then fed into exact alignment with honeycomb 14. By exact alignment is meant that the nodes on the side of strip 16 toward the honeycomb are aligned with the nodes of the honeycomb that project toward the strip 16 so that when the strip is brought together with the honeycomb the nodes that are to be welded together will be in alignment.

Strip 16 and honeycomb 14 are then brought together with the nodes referred to in engagement as indicated at 24. The strip 16 and the honeycomb 14 are then clamped together with the nodes in pressure engagement and the assembled unit is then elevated from its assembling position to a welding position as indicated in FIGURE 5.

After the assembly has been elevated to its FIGURE 5 position a plurality of electrodes generally indicated at 26 in FIGURE 6, one for each weld line, are brought into engagement with the nodes to be welded together and the welding is carried out by relative movement between the electrodes and the honeycomb. Thereafter, the honeycomb is lowered to its original position and moved backwardly sufficiently far to receive a new strip and a new strip 16 is supplied to the honeycomb as described above.

Since the nodes of the honeycomb that are now projecting toward the new strip are a half pitch removed from the previously welded nodes, either the honeycomb or the new strip 16 is indexed longitudinally a half pitch prior to the next following assembling operation.

According to the present invention, in order to eliminate indexing or shifting of the welding electrodes, the honeycomb is so indexed whereby the welding of the successive nodes always takes place along the same welding lines as established by the location of the electrodes.

For the purpose of backing up the lines of welding, and to maintain the cells of the honeycomb in proper shape and size, there is a set of welding fingers or pins that are inserted in the outermost cells 28 of the honeycomb and against which the welding electrodes bear during a welding operation. Inasmuch as the honeycomb is indexed a half pitch between successive welding operations, these same welding pins will enter the new cells formed when the new strip is welded to the honeycomb and the pins will accordingly again form back up elements for the welding operation.

Reference to FIGURES 7 through 11 will disclose somewhat in detail the structure of the machine which the aforementioned described steps of feeding, crimping, and locating strips during the building up of the honeycomb is accomplished.

In these figures it will be noted that the device comprises a hollow bed 37 which has a portion 38 at one level on which the part of the apparatus which handles the built up honeycomb is mounted and another elevated portion at 39 on which is mounted the feed chain that feeds the strip into alignment with the honeycomb and which also carries the crimping and welding devices. The arrangement of the crimping and feeding devices will be seen in FIGURES 7 and 8 wherein the strip that is being fed is indicated at 18a. This strip passes over guide roller 30 and through a drag element 31 to the crimping station which comprises a pair of meshing forming members 32 and 34 which are similar to gears and which are arranged to crimp the strip into the proper corrugated configuration.

Forming member 34 is supported on a shaft 36 adjustable by screw means 36' and adapted for being clamped in position to provide proper spacing of the forming members from each other.

The forming members and the feed chain are driven via a gear 42 fixed to the same shaft as forming member 32 and meshing with gear 44 that is driven through speed reducing unit 46 from hydraulic motor 48.

The feed chain is driven by bevel gears 50 and 52 on the same shaft with forming member 32 which drive through a shaft 54 to the miter gears 56 and 58 into shaft 60 which extends longitudinally of the hollow bed 37 toward the right end thereof as it is viewed in FIGURE 8.

At the right end shaft 60 has a bevel gear 62 meshing with gear 64 which is fixed to a shaft that adjustably receives at its upper end sprocket 66.

The feed chain referred to is indicated at 68 and comprises a plurality of interconnected links. The chain passes about sprocket 66 at the right end of the machine and sprocket 70 at the left end of the machine and rests on the raised portion 39 of the hollow bed.

Each link of chain 68 carries a serrated block 72 and the blocks are so arranged that they form a rack along the straight reaches of the chain and which rack meshes with forming member 32 so as to receive the crimped strip directly therefrom.

The reach of the chain that actually feeds the crimped strip toward the honeycomb is guided along the initial part of its travel by a bar 73 and in the region that the feed chain lines up with the honeycomb the chain is backed up by the resiliently supported plates 75.

The cut off station previously referred to will be seen in FIGURE 7 to consist of a knife portion 74 adapted for severing the strip and entering the space between the adjacent of blocks 72. Knife blade 74 is associated with a clamp 77 that clamps the strip on opposite sides of knife blade thereby eliminating burring of the strip and permitting the knife to be retracted from the strip without bending thereof.

Since it is essential for the chain to be exactly aligned with the cut off station 22 and also with the honeycomb to which the newly fed strip is to be attached, means are provided for locating the chain in the form of a pair of shot bolts 76 which are hydraulically operable for entering the space between the adjacent rollers of the chain thereby accurately to locate the chain.

Referring now to FIGURES 9 and 10, the portion of the machine that supports the built up honeycomb and manipulates the honeycomb and the welding fingers will be seen.

On the previously mentioned portion 38 of the hollow bed there is a guideway 80 on which rests a base 82. Connected between the base 82 and the portion of the bed 38 is a hydraulic motor 84 for reciprocating the base on the bed. Attached to base 82 and extending vertically upwardly therefrom are spaced guide columns 86 interconnected at their upper ends by a plate 88.

Positioned over the base 82 and slidable on the guide columns is a platen 90 which has its lowermost position predetermined by stop nuts 92 on the guide columns.

Hydraulic motors 94 are connected between base 82 and platen 90 for vertical reciprocation of the platen on the guide columns.

Resting on platen 90 is a table 96 which is connected with the platen by guideway 98 for lateral reciprocating movements on the platen. A hydraulic motor 100 connected between the platen and the table accomplishes the aforementioned lateral reciprocation.

The table 96 suppotrs the built up honeycomb 14 at the same level as the feed chain 68 when platen 90 is in its lower position.

A clamp member 102 is positioned over table 96 and is adapted for being raised and lowered relative to the table into unclamping or clamping relation with the honeycomb by means of hydraulic motors 104 connected between the ends of the table and clamp member.

Disposed above clamp member 102 and guided on guide columns 86 is a welding pin clamp member 106 that has suspended therebeneath on a front to back dove tail guide 108 the welding pin shuttle member 110.

A hydraulic motor 112 connected between welding pin clamp member and the welding pin shuttle is operable for shuttling the shuttle member in the front to back direction.

The welding pin clamp member 106 is connected by a hydraulic motor 114 with an upper platen 116 which is slidable on guide columns 86 and which is connected by rods 118 with lower platen 90.

The welding pin shuttle member 110 has attached to the front thereof a bar 120, preferably brass, which is notched at its lower end for receiving the fingers 122 that enter the last row of cells of the honeycomb and back up the lines along which welding is to take place.

The fingers 122 are clamped in position by a clamp bar 124. The described arrangement for supporting the fingers will be seen in FIGURE 11 wherein it will also be noted that bar 124 has suspended therebeneath by pins 126 a clamp bar 128. Springs 130 urge clamp bar 128 downwardly. The arrangement is such that the clamp bar 128 can be avoided of for clamping the new strip in position against the honeycomb simultaneously with introducing the fingers into the outermost row of cells of the honeycomb.

FIGURE 11, in combination with FIGURE 9, will also disclose that attached to platen 90 there is a bar or plate 132 which extends up to just beneath the outer tips of the serrated blocks on the feed chain on the honeycomb side so that the strip being fed into welding position is supported on the plate or bar 132.

In FIGURE 11, taken in connection with FIGURE 9, it will also be noted that there is a baffle member 134 which is attached to base 82 and which extends upwardly between plate 132 and platen 90 on table 39 which has fingers 148 extending into the recesses of the outer face of the honeycomb. The baffle is provided with air passage means 150 that extend into the fingers of the baffle and communicate with apertures 152 therein so that a curtain of air is provided to hold the strip being fed against the feed chain.

This baffle is shown as a fingered member that establishes an air curtain and which is stationary relative to base 82 but it will be evident that the baffle could be arranged to reciprocate vertically by means of a hydraulic motor or the like in which case the baffle could be a solid continuous member either with or without air jets for supporting the new strip against the feed chain.

FIGURE 11 will also disclose that the blocks 72 of the feed chain are slightly narrower than the new strip being fed so that clamp bar 128 will bear directly on the edges of the new strip and the clamping action thereof will not be interfered with by the feed chain.

The aforementioned portion 39 of the hollow bed is availed of for supporting electrodes to accomplish the welding of the strips to the honeycomb.

In FIGURE 9 it will be noted that there is a support means 160 provided on which there is slidably mounted member 162 and which members are adapted for being reciprocated on the support in the front and back direction by hydraulic motors 164. Supports 162 provide trunnion mounts for an electrode carrier 166 that carries a plurality of crescent shaped electrodes 168 which are adapted for engaging the nodes of the strip being added to the honeycomb to accomplish the welding thereof. The crescent shaped electrodes have substantially the same peripheral length as the nodes to be welded and are rolled along the nodes in a manner to be described hereinafter to accomplish the simultaneous welding of the nodes from top to bottom of the honeycomb.

The electrodes are connected to one side of a source of welding current and the other side of the source of welding current is connected with plate 120 to which the welding fingers are clamped.

FIGURE 12 shows somewhat more in detail the construction of the cut off station 22. In this figure it will be noted that the clamp member 77 is affixed to a double-action piston 180 disposed in a cylinder 182. The piston can be reciprocated by fluid pressure to bring the clamp into or out of engagement with the strip.

Disposed inside piston 182 is another piston 184 having a tail rod 186 extending out the back end of the cylinder which operates an interlocking limit switch. The tail rod is also operable for bearing on one end of a spring 188 so that when the cut off device is operated the clamp first engages the strip and then the cut off blade 74 is actuated by its piston 184.

The previously mentioned resilient back up members 75 for the feed chain are illustrated in FIGURES 13 and 14 wherein it will be noted that the members 75 have rods 190 attached thereto extending through the stationary support rail 192. Springs 194 urge the members 75 against the back of feed chain 68 and stop nuts 196 on the rods determine the innermost positions of the resilient members.

FIGURE 15 illustrates the construction of the hydraulic motor 84 which is connected between the bed and the base 82. This hydraulic motor comprises a piston 198 and a cylinder 200 with the piston having tail rod 202 extending out the back end of the cylinder and carrying a limit switch actuating member 204. The piston rod 206 extending from the piston to the base 82 also has attached thereto a limit switch actuating member 208.

The right end of cylinder 200 is formed with a short cylinder portion 210 which is somewhat larger than cylinder 200. A piston 212 is located in portion 210 and is adapted for being abutted by nut 214 of tail rod 202 when piston 198 is in a predetermined position toward the left end of cylinder 200. The arrangement is such that the release of pressure from the left side of piston 212 while supplying fluid to the right side of piston 198 will permit a predetermined amount of leftward movement of base 82 and the parts of the machine mounted thereon whereas reversing of the pressure supply to piston 198 will cause rightward movement of the base.

The previously mentioned fluid motors 94 which may be referred to as "jack motors" and which are connected between base 82 and lower platen 90 are constructed as will be seen in FIGURE 9.

In FIGURE 9 the motors will be seen to comprise cylinders 216 having therein pistons 218 connected by rods 220 with platen 90. Cylinders 216 are supported on the underneath side of base 82.

Toward the upper end of cylinders 216 there are the pistons 222 somewhat larger than pistons 218 and through which rods 220 are slidable. An extension 225 on each piston 218 is adapted for abutting the underside of pistons 222 in a predetermined elevated position.

The arrangement is such that while pressure is standing on the upper faces of pistons 222, they provide stops so that a supply of pressure to the undersides of pistons 218 will cause them to elevate into abutting engagement with pistons 222. Thereafter, a continuous supply of pressure to the undersides of pistons 218 accomplished by a release of pressure from the upper sides of pistons 222 will bring about further upward movement of pistons 218.

With regard to the fluid motor 100 which laterally reciprocates table 96 on platen 90, this will be seen in FIGURE 10 to comprise a cylinder 224 attached to platen 90 and a piston 226 attached to table 96.

Platen 90 has a fixed stop plate 228 that determines the limit of movement of table 96 in one direction and at the other side there is a detachable stop plate 230 that forms an adjustable stop for determining the limit of movement of the table in the opposite direction.

The limits of the aforementioned welding pin shuttle member 110 relative to the welding pin clamp member 106 can be determined by the spaced stop nuts 232 carried on a bolt 234 attached to the shuttle member and slidable through plate 236 which is fixed to the clamp member and which is attached to the piston forming a part of the hydraulic motor connecting the shuttle member with the clamp member.

Bolt 234 is also utilized for actuating interlocking limit switch means.

The construction arrangement of the electrodes and the supports therefor will be seen in FIGURES 16, 17, and 18.

In these views it will be observed that the support members 160 carry the reciprocating members 162 by means of dove tail guide members 238. The fluid motors 164 comprise pistons 240 fixed to the supports 160 and extending into cylinders formed in the members 162.

The members 162 receive the trunnions 242 which have their inner ends formed as brackets 244 to which are bolted the elongated guide members 246 of stainless steel and bearing bronze which define a plurality of slots 248 through which the insulated shanks 250 of the previously referred to electrodes 168 extend. These shanks are attached to cross-heads 252 between which and the members 246 there are the tension springs 254 which bias the electrodes toward the honeycomb.

The cross-heads 252 are also availed of for connecting the welding leads 256.

It has been found advantageous to power the electrode carrier so that the electrodes will roll on the honeycomb without slipping and to this end there is provided a motor consisting of a cylinder 260 and a piston 262 therein connected with the electrode carrier for rocking it about trunnion mounting.

Since alignment of the electrodes with the regions to be welded is important, the trunnion mountings for the electrode carrier are provided with adjustable members 264 and 266 so that the exact position of the electrode carrier can be adjusted axially and all lost motion axially compensated for.

FIGURE 19 diagrammatically illustrates a hydraulic system by means of which the described apparatus can be operated.

In FIGURE 19 the motor M drives pumps P1 and P2 which draw fluid from a reservoir 300 and then discharge the fluid under pressure into conduits 302 and 304. Conduit 302 leads to the inlet of a four-way reversing valve 306 which is spring operated in one direction and operated in the other direction by energization of a solenoid S1. When solenoid S1 is energized fluid is conveyed through the valve to a conduit 308 leading to the inlet of the previously described hydraulic motor 48 which drives the crimping rolls and the feed chain.

The discharge side of the motor is connected by a conduit 310 with the inlet of a choke valve 312 and the inlet of a valve 314 which is movable by energization of a solenoid S2 into position to connect conduit 310 with the conduit 316 leading from the down stream side of choke valve 312 whereby the choke can be by-passed.

The conduit 316 leads through a check valve 318 to a port of valve 306 which, when solenoid S1 is energized is connected with the exhaust conduit 320.

Connected between conduits 316 and 308 is a valve 322 which will open in response to a predetermined pressure in conduit 316.

The arrangement is such that when solenoid S2 is de-energized and solenoid S1 is energized, motor 48 runs at high speed.

Energization of solenoid S2 will interrupt the by-pass around valve 312 whereupon motor 48 will slow down, and then, upon de-energizing solenoid S1, valve 322 will act as a cushioning brake.

Pump P1 also discharges through a choke valve 324 to a conduit 326 which leads to the inlet of a center by-pass, four-way, reversing valve 328 controlled by solenoids S3 and S4 and normally spring centered. This valve is connected to the opposite ends of cylinder 182 that actuates the clamp 77 and cutting blade 74 of the cut off station.

Conduit 326 also leads to the inlet of another normally spring centered, center by-pass, four-way, reversing valve 330 under the control of solenoids S5 and S6 which is connected with the fluid motors pertaining to the shot bolts 76.

Conduit 326 is also connected with the inlet of still another normally spring centered, center by-pass, four-way, reversing valve 332 which is under the control of solenoids S7 and S8 and which is connected with the two ports in cylinders 200 of the feed motors 84 on opposite sides of the main piston 198 therein. The conduit leading to the retracting side of piston 198 contains the choke valve 334.

The port in the portion 210 of cylinders 200 which pertain to the pistons 212 are connected through a choke valve 336 with the service port of a reversing valve 338 normally spring urged to connect the said conduit with pressure line 326 but movable by a solenoid S9 into position to exhaust the said conduit.

Conduit 326 is also connected with the inlet of a four-way valve 340 which is normally spring centered and which is under the control of solenoids S10 and S11. In its centered position valve 340 interconnects the service conduits, the exhaust conduit and the pressure conduit for a complete by-passing of pressure fluid to the tank. The one service port of the valve is connected through a choke valve 342 with the ports in cylinders 216 of platen jack motors beneath pistons 222 thereof.

The other service line from valve 340 leads through a check valve 344 to the ports in cylinders 216 beneath pistons 218. Check valve 344 is by-passed by a valve 346 which is normally closed but which opens in response to a predetermined pressure on the cylinder side thereof.

Conduit 326 is also connected to a four-way reversing valve 348 which is normally spring urged in one direction and is moved in the other direction by a solenoid S12. The service port of this valve is connected through a check valve 350 opening away from the four-way valve with the port in the upper end of cylinder 216 above piston 222. A choke valve 352 by-passes check valve 350 so as to be effective when fluid is flowing away from the upper end of cylinder 216. When solenoid S12 is de-energized pressure is supplied to the upper end of cylinder 216 and when solenoid S12 is energized fluid is permitted to flow from the upper ends of the cylinders.

Conduit 326 is also connected through a reducing valve 341 with the inlet of a reversing valve 343 normally spring urged in one direction and adapted for being shifted in the opposite direction by a solenoid S23. The service ports of said valve are connected with the opposite ends of the cylinder 262 of the motor that rocks the electrode carrier during a welding operation.

The remainder of the hydraulic circuit is fed by pump P2 which discharges into conduit 304 via the choke valve 354. Conduit 304 is connected through a sequencing valve 356 with the inlet of a four-way valve 358. Valve 358 is of the same type as valve 328 in that it is normally spring centered, by-passes the service lines to exhaust when centered, is under the control of a pair of shifting solenoids S13 and S14. Valve 356 is normally closed and is adapted for opening when a predetermined pressure is established at its inlet.

One service line from valve 358 is connected through a check valve 360 with the retracting sides of the cylinders 104 of the welding pin clamp motors. This check valve is by-passed by a valve 362 normally closed which will open in response to a predetermined pressure on the cylinder side thereof thus forming a control bar arrangement.

The other service line from valve 358 is connected through a choke valve 364 and a pressure reducing valve 366 with the advancing sides of the welding pin clamp motors 114. The pressure reducing valve 366 is bypassed by a check valve 368 which permits free flow away from the upper ends of motors 114, and choke valve 364 is similarly by-passed by a check valve 370 permitting free flow away from motors 114.

Conduit 304 leads to the inlet of still another four-way valve 372 of the same nature as valve 358 in that it is normally spring centered and is a center by-pass, four-way, reversing valve under the control of shifting solenoids S15 and S16. One service port of valve 372 is connected with the retracting sides of the pistons that actuate the electrodes and the other service port of the valve is connected through a choke 374 with the other sides of the pistons. Choke 374 is by-passed by check valve 376 which permits free flow away from the said pistons.

Conduit 304 is connected with the inlet of a normally spring centered, center by-pass, four-way reversing valve 380 under the control of shifting solenoids S17 and S18. This valve has one service port connected with the sides of motors 104 that actuate the grid clamp in its clamping direction and the other side of the reversing valve is connected through a check valve 382 with the opposite sides of the grid clamp motors.

Check valve 382 is by-passed by a balancing valve 384 which opens in response to a predetermined pressure on its cylinder side.

Conduit 304 is connected through a valve 385 that is normally closed which opens in response to a predetermined pressure on its inlet side with a conduit 387. Conduit 387 leads to the inlet of a valve 388 which is normally spring centered and is of the center by-pass type and which is under the control of solenoids S19 and S20.

One service port of valve 388 is connected with one end of the table shuttling motor 100 and the other service port is connected with the other end of the said motor through a choke valve 390.

Conduit 385 is also connected with the inlet of still another normally spring centered, center by-pass, four-way reversing valve 392 that is under the control of shifting solenoids S21 and S22. One service port of the valve is connected through a choke valve 394 with one side of the welding pin shuttling pistons and the other service port of the valve is connected with the other side of the said pistons.

*Operation*

The operation of the described structure will best be seen on reference to FIGURES 11 and 21 through 27.

Assuming that there is a portion of built-up honeycomb in the machine on the table, a new strip is fed into the machine by actuating motor 48 which will cause the strip to be crimped and delivered to the feed chain and carried along until the chain is stopped for the cutting off operation. In this connection it will be noted in FIGURES 7 and 20 that there is geared to shaft 60 a control shaft 400 having a wheel 402 thereon with cams 404 and 406 that control a limit switch LS1.

The limit switch determines two positions of the feed chain. The first position is a position where the length of strip which has been fed past the cut off station is equal to the length of strip that is to be delivered to the honeycomb. When this length of strip has been fed past the cut off station, the feed chain stops, the shot bolts are inserted and the cut off station operates. The cut off knife and clamp then retract and the feed chain again operates and this time conveys the strip into alignment with the honeycomb whereupon switch LS1 is again operated and brings the feed chain to a halt and the shot bolts again engage the feed chain and hold it in a properly located position. In each case the motor control circuit causes the motor to start at high speed and then to slow down shortly before stopping.

At this time, the feed chain and the new fed strip and the honeycomb are in their FIGURE 11 position. The new strip is aligned with the honeycomb so that the nodes on the side of the new strip are in register with the nodes on the outer face of the honeycomb.

As will be seen in FIGURE 21 the next step in the cycle is a feed cycle and which is accomplished by releasing the pressure from the left side of pistons 212 which permits pistons 198 to move base 82 and all parts connected therewith leftwardly thus to bring the honeycomb into pressure engagement with the new strip with a pressure that will be determined by the pressure members 75 backing up the feed chain.

The next step in the cycle is the clamping of the new strip against the face of the honeycomb as indicated in FIGURE 22. This is accomplished by moving the welding pin clamp downwardly bringing the clamp bar 128 suspended therefrom into engagement with the upper edge of the new strip and which, as will be seen, is slightly wider in the vertical direction than the feed chain.

Simultaneously with the clamping of the new strip, the valve pertaining to the grid clamp is centered and the grid clamp is thus de-pressurized.

The next step in the process is indicated in FIGURE 23 and which consists of reversing the supply of pressure to piston 198 to cause base 82 and the parts connected therewith to retract from the feed chain with the new strip which is now clamped between plate 132 and clamp bar 128 being carried with the honeycomb.

The platen jack motors are now actuated by a supply of pressure to the undersides of the pistons 218 to cause upward movement of the platen and table and grid clamp and welding pin clamp together with the built-up honeycomb and new strip upwardly into a position of alignment with the electrodes. The platen jack pistons 218 will stop when they abut the undersides of pistons 222. The parts are now in their FIGURE 24 position.

At this time the electrode advancing motors 164 are actuated and the electrodes are moved inwardly into pressure engagement with the nodes of the new strip that are to be welded to the built-up honeycomb. At this time the grid clamp is in float position and the welding pins are clamped.

When the electrodes are completely in a switch is tripped that actuates a timer and after an adjustable time delay the welders are energized and the welding action commences.

The platen now rises at a controlled speed and simultaneously the valve controlling the motor that rocks the electrodes will be actuated to cause the electrodes to rock upwardly. Due to the pressure of the electrodes against the honeycomb, the rocking of the electrodes lifts the welding pin clamp and the honeycomb.

At the top of the welding stroke a limit switch operates which causes the electrodes to withdraw, the weld pins to go to float and the grid clamp to rise. When the grid clamp rises another limit switch operates and causes the weld pins to shuttle to the rear.

At the end of this shuttling movement a limit switch is actuated which again causes the grid clamp to lower to clamp the honeycomb on the table. The lowering of the grid clamp controls another limit switch which causes the welding pin clamp control valve to be actuated so that the welding pins now rise withdrawing the pins from the cells in which they were located. When the welding pin clamp reaches the top of its stroke, the valve controlling the table is actuated causing the table to shuttle to its other end position and thus shifting the honeycomb a half pitch in the machine.

The completion of the table shuttling movement is followed by the welding pins descending at a controlled rate and starts to enter the outermost row of cells. When the pins are partially in this row of cells a proximity switch operates and reverses the welding pin shuttle action. The welding pins continue their descent until they reach their bottom position. At this time the grid clamp is caused to rise and the welding pin control valve goes to neutral so that the welding pin clamp floats.

When the grid clamp reaches its upper position a switch is tripped that causes the welding pin shuttle again to pull the honeycomb backwardly away from the feed chain and when this movement is completed the platen jacks will descend and when they have reached the lowermost position the feed motors will advance to their intermediate positions.

At this time the parts of the machine are again in the position they occupy in FIGURE 11 except that the welding pin shuttle is in a retracted position. This shuttle is advanced before a new cycle is initiated.

In the drawings, the position of the parts when the electrodes first engage the new strip is indicated in FIGURE 25, whereas, FIGURE 26 illustrates the parts with the welding partly accomplished, and FIGURE 27 shows the parts at the conclusion of the welding operation.

It will be noted that the clamp bar 128 may be notched as at 408 so that there will be no interference with the electrodes at the initiation of the welding operation and that similarly, member 132 at the bottom of the strip may be notched at 410 so as not to interfere with the electrode at the end of the welding operation.

FIGURE 28 shows the indexing of the honeycomb in a direction away from the feed chain after the welding has been completed and FIGURE 29 shows the welding pins dis-engaged from the honeycomb.

FIGURE 30 shows the honeycomb after it has been shuttled laterally by movement of the table, and FIGURE 31 shows the welding pins again engaged with the new row of cells of the honeycomb.

A new cycle will be commended if the machine is set for automatic exactly as before except that the first step in the new cycle is the actuation of the welding pin shuttle back to its position where the honeycomb is located ready to receive a new strip as indicated in FIGURE 11.

The additional indexing movement of the welding pin shuttle is employed for the purpose of preventing the built-up honeycomb from snagging on the baffle member disposed between the honeycomb and the new strip but may not be essential in certain cases where the arrangement is such that the baffle will have adequate clearance from the honeycomb. This might be the case where the honeycomb cells were of an intermediate or larger size and the extra indexing movement of the welding pin shuttle might be necessary where the cells of the honeycomb were small, say ½" or smaller.

It will be evident that the present invention provides an arrangement for rapidly forming honeycombs particularly characterized in that multiple welds are made simultaneously so that each new strip is fixed to the built-up honeycomb in a single welding cycle. Heretofore, honeycombs have been built-up by individually making the welds which involves a great deal of manual labor and lost time and without the advantage of automatic control of the welding operation.

The several feeding and indexing movements of the machine, the honeycomb, the new strip, and the electrodes, are all readily accomplished by hydraulic motors and can readily be interlocked by electric switches and sequencing valves.

The width of the honeycomb transversely of the machine has been referred to as 6 to 12', but it will be evident that still greater widths could be constructed utilizing the principles of the present invention.

In the vertical direction the width has been stated to be from 1 to 3 or 4", but it will be evident that this width or height could be substantially increased while still practicing the present invention particularly with honeycombs having larger cells where the welding pins would be adequately stiff to support the electrode pressures.

As to the dimension of the honeycomb in the front to back direction of the machine, this is without limit and the honeycomb can be built-up to any desired length merely by continuing to add new strips thereto.

It has been mentioned that the baffle member which retains the corrugated strip in engagement with the transfer rack can be moved into and out of operative position between the face of the honeycomb and the corrugated strip being fed into position. When the baffle member is so moved it can consist of a solid member either with or without air jets.

FIGURE 32 illustrates the manner in which a piston 414 can be connected with the baffle member with the posititon being reciprocable in cylinder 412.

The motor thus formed could either be hydraulically or pneumatically operated and this would serve to raise and lower the baffle at the proper time.

While the material usually employed for welded honeycombs is steel, it will be understood that other weldable metals could be employed. As long as the metal is weldable it can be operated on according to the method and apparatus of the present invention.

It will be understood that this invention is susceptible to modification in order to adapt it to different usages and conditions; and accordingly, it is desired to comprehend such modifications within this invention as may fall within the scope of the appended claims.

I claim:

1. A method of making welded metallic honeycomb which comprises; feeding a metal strip in the direction of its length, crimping the strip into a corrugated configuration simultaneously with the feeding thereof, delivering the strip into parallel spaced relation with the face of the body of honeycomb to which it is to be joined and with the nodes of the strip toward the honeycomb in alignment with the projecting nodes of the honeycomb, moving the strip and honeycomb relatively to bring the said nodes into pressure engagement with each other, clampingly engaging the edges of the strip and the body of honeycomb adjacent the strip for clamping the strip to the honeycomb, and welding all of the said nodes together from end to end at one time.

2. The method of making welded metallic honeycomb which comprises; feeding a metal strip in the direction of its length, crimping the metal strip in a forming station into a corrugated configuration, delivering the corrugated strip directly from the forming station to a transfer rack running parallel to the face of a body of honeycomb to which the strip is to be connected, cutting off the strip on the rack to the same length as the body of honeycomb, moving the cut off strip with the rack into spaced alignment with the body of honeycomb with the nodes of the cut off strip on the side toward the honeycomb in alignment with the nodes projecting from the face of the honeycomb, introducing welding fingers into the outermost row of cells of the body of honeycomb, moving the cut off strip into presure engagement with the body of the honeycomb, clampingly engaging the longitudinal edges of the strip and the body of honeycomb adjacent thereto to clamp the cut off strip to the body of honeycomb, engaging the back of the cut off strip with welding electrodes where the nodes are to be welded together, and moving the electrodes relatively to the cut off strip and honeycomb while simultaneously passing welding current from the electrodes through the cut off strip and honeycomb into said fingers thereby to weld the cut off strip to the honeycomb, all of the lines of welding connecting a cut off strip with the honeycomb being accomplished simultaneously.

3. The method of making welded metallic honeycomb which comprises; stationarily supporting a body of honeycomb; feeding metal strip in the direction of its length and simultaneously crimping the strip to a corrugated configuration, with each corrugation having a narrow flat area at the nodes thereof, cutting off the said strip to a length equal to the width of the body of the honeycomb and delivering the cut off strip into spaced parallel relation with the body of honeycomb and with the nodes of the strip on the side of the honeycomb in register with the projecting nodes of the body of the honeycomb, introducing fingers into the row of cells of the honeycomb nearest the strip, bringing the strip and honeycomb into pressure engagement along the full length of the strip, clamping the strip to the honeycomb by engaging the edges thereof, bringing electrodes into pressure engagement with the surface of the strip directly opposite the nodes thereof that are abutting the honeycomb, moving the honeycomb and strip relative to the electrodes while simultaneously passing welding current from the electrodes through the abutting nodes into the fingers thereby simultaneously to secure all of the abutting nodes together, and preparing for the addition of a new strip to the honeycomb by withdrawing the said fingers therefrom and re-positioning the fingers in the new row of cells formed on the honeycomb by the new strip and returning the honeycomb to its original position.

4. The method of making welded metallic honeycomb which comprises; stationarily supporting a body of honeycomb; feeding metal strip in the direction of its length and simultaneously crimping the strip to a corrugated configuration, with each corrugation having a narrow flat area at the nodes thereof, cutting off the said strip to a length equal to the width of the body of the honeycomb and delivering the cut off strip into spaced parallel relation with the body of honeycomb and with the nodes of the strip on the side of the honeycomb in register with the projecting nodes of the body of the honeycomb, introducing fingers into the row of cells of the honeycomb nearest the strip, bringing the strip and honeycomb into pressure engagement along the full length of the strip, clamping the strip to the honeycomb by engaging the edges thereof, bringing electrodes into pressure engagement with the surface of the strip directly opposite the nodes thereof that are abutting the honeycomb, moving the honeycomb and strip relative to the electrodes while simultaneously passing welding current from the electrodes through the abutting nodes into the fingers thereby simultaneously to secure all of the abutting nodes together, moving the honeycomb together with the new strip backwardly away from the side to which the new strip was added, withdrawing the fingers from the honeycomb, shifting the honeycomb together with the new strip laterally a distance equal to half the pitch of the honeycomb, and again introducing the fingers into the honeycomb in the new cells formed by the new strip added thereto.

5. The method of making welded metallic honeycomb which comprises; stationarily supporting a body of honeycomb; feeding metal strips in the direction of its length and simultaneously crimping the strip to a corrugated configuration, with each corrugation having a flat area at the nodes thereof, cutting off the said strip to a length equal to the width of the body of the honeycomb and delivering the cut off strip into spaced parallel relation with the body of honeycomb and with the nodes of the strip on the side of the honeycomb in register with the projecting nodes of the body of the honeycomb, introducing fingers into the row of cells of the honeycomb nearest the strip, bringing the strip and honeycomb into pressure engagement along the full length of the strip, clamping the strip to the honeycomb by engaging the edges thereof, bringing electrodes into pressure engagement with the surface of the strip directly opposite the nodes thereof that are abutting the honeycomb, moving the honeycomb and strip relatively to the electrodes while simultaneously passing welding current from the electrodes through the abutting nodes into the fingers thereby simultaneously to secure all of the abutting nodes together, shifting the honeycomb with the new strip welded thereto and the fingers in a direction away from the side of the honeycomb to which the strip was added a distance sufficient to bring the new row of cells established on the honeycomb by the new strip into the same lateral position as the previous row of cells, withdrawing the said fingers and then returning them to their initial position, indexing the honeycomb laterally to align the said new cells with the fingers and introducing the fingers into the said new cells.

6. A method of feeding and forming metal strip to be welded to a body of honeycomb which comprises; feeding the metal strip in the direction of its length, passing the strip between meshing forming members to form the strip to a corrugated configuration, transferring the strip from one of said forming members directly to a transfer rack meshing with the said one forming member, and confining the crimped strip in engagement with the rack while transferring the strip with the rack to the position where it is to be joined to the body of honeycomb.

7. A method of feeding and forming metal strip to be welded to a body of honeycomb which comprises; feeding the metal strip in the direction of its length, passing the strip between meshing forming members to form the strip to a corrugated configuration, transferring the strip from one of said forming members directly to a transfer rack meshing with the said one forming member, and confining the crimped strip in engagement with the rack while transferring the strip with the rack to the position where it is to be joined to the body of honeycomb, the said confining of the strip in a position of engagement with the rack being accomplished by an air curtain directed against the side of the strip opposite the rack.

8. The method of crimping and delivering a metal strip into position to be welded to a body of honeycomb; feeding the strip in the direction of its length, crimping the strip simultaneously with the feeding thereof by passing it through a pair of meshing gear-like forming members whereby the strip is corrugated to the desired configuration, transferring the crimped strip directly from one of the forming members to a transfer rack meshing therewith, confining the strip in a position of engagement with the transfer rack, interrupting the movement of the strip and rack, when a predetermined length of strip has been delivered to the rack, severing the strip on the rack, resuming movement of the rack to bring the severed end of the strip into spaced parallel alignment with one face of the body of the honeycomb with which it is to be joined, advancing the honeycomb bodily into engagement with the full length of the severed end of the strip, and clamping the severed end of the strip to the honeycomb.

9. The method of crimping and delivering a metal strip into position to be welded to a body of metal honeycomb; feeding the strip in the direction of its length, crimping the strip simultaneously with the feeding thereof by passing it through a pair of meshing gear-like forming members whereby the strip is corrugated to the desired configuration, transferring the crimped strip directly from one of the forming members to a transfer rack meshing therewith, confining the strip in a position of engagement with the transfer rack, interrupting the movement of the strip and rack after a predetermined length of strip has been fed through said forming members, severing the strip on the rack, resuming movement of the rack to bring the severed end of the strip into spaced parallel alignment with one face of the body of honeycomb with which it is to be joined, advancing honeycomb bodily into engagement with the severed end of the strip, resiliently supporting said transfer rack for yielding movement when the body of honeycomb is moved into engagement with the severed end of the strip to develop a predetermined pressure of the severed end of the strip against the body of honeycomb, and engaging the edges of the severed end of the strip and the body of honeycomb adjacent thereto to clamp the severed end of the strip to the body of honeycomb.

10. An apparatus for making welded honeycomb which comprises; means for supporting a body of honeycomb, means for moving a corrugated strip into spaced parallel alignment with the face of the body of honeycomb, means for pressing the strip and the body of honeycomb together, means for engaging the edges of the strip and the body of honeycomb adjacent thereto for clamping the strip to the body of honeycomb, and means for welding all the nodes of the strip simultaneously to the nodes of the body of honeycomb comprising a plurality of electrodes engageable with said nodes of the strip.

11. An apparatus for making welded honeycomb which comprises; means for supporting a body of honeycomb, means for delivering a corrugated metal strip to be joined to the honeycomb into spaced parallel relation with the face of the body of honeycomb to which it is to be connected, means for moving the body of honeycomb and the strip relatively into pressure engagement with the nodes of the strip projecting toward the honeycomb, means engaging the strip and body of honeycomb at the edges thereof to clamp the strip to the body of honeycomb while leaving the outside face of the strip exposed, means supportingly engaging the backs of the nodes of the face of the honeycomb that project toward the strip, and welding electrode means adapted for engagement with all of the nodes of the strip that are in engagement with nodes on the body of honeycomb simultaneously and operable for simultaneously welding all of the nodes together at one time.

12. In an apparatus for making welded honeycomb; a table for supporting a body of honeycomb, a transfer member adapted for moving a corrugated strip into spaced parallel alignment with the adjacent face of the body of honeycomb and with the nodes of the strip projecting toward the face of the honeycomb in register with the projecting nodes on the face of the body of honeycomb, means for bringing the strip and body of honeycomb together in pressure engagement and for clamping the strip and honeycomb together, means for moving the body of honeycomb and the transfer member relatively to expose the face of the strip clamped to the body of honeycomb, and means for welding the strip to the body of honeycomb comprising multiple electrodes adapted for being brought into pressure engagement with the exposed face of the strip at the regions where the nodes of the strip engage the nodes of the body of honeycomb.

13. In an apparatus for making welded metal honeycomb; a table adapted for supporting a body of honeycomb, a transfer rack movable adjacent the face of the honeycomb adapted for conveying a corrugated metal strip into alignment with the honeycomb, means for bringing the strip and honeycomb together in pressure engagement and for clamping the strip to the honeycomb, means for moving the table together with the body of honeycomb and the strip clamped thereto away from the transfer rack to expose the face of the strip opposite the honeycomb, and multiple electrodes adapted for being brought into pressure engagement with the strip on the exposed side thereof for welding the strip to the honeycomb.

14. In an apparatus for making welded metal honeycomb; a table adapted for supporting a body of honeycomb, a transfer rack adjacent the table extending parallel with the face of the honeycomb adapted for transferring a corrugated strip to a position of alignment with the honeycomb, means for moving the table and the honeycomb thereon toward the rack to bring the honeycomb into pressure engagement with the said strip, clamp means movable with the table for clamping the strip to the honeycomb, means for elevating the table and the body of honeycomb and the strip clamped thereto upwardly from the transfer rack to expose one face of the strip, a plurality of electrodes above the transfer rack, means for moving the electrodes into pressure engagement with the said one face of the strip, and means for moving the electrodes and the strip and honeycomb relatively to weld the strip to the honeycomb.

15. In an apparatus for making welded metal honeycomb; a table adapted for supporting a body of honeycomb, a transfer rack adjacent the table extending parallel with the face of the honeycomb adapted for transferring a corrugated strip to a position of alignment with the honeycomb, means for moving the table and the honeycomb thereon toward the rack to bring the honeycomb into pressure engagement with the said strip, clamp means movable with the table for clamping the strip to the honeycomb, means for elevating the table and the body of honeycomb and the strip clamped thereto upwardly from the transfer rack to expose one face of the strip, a plurality of electrodes above the transfer rack, means for moving the electrodes into pressure engagement with the said one face of the strip, and means for moving the electrodes and the strip and honeycomb relatively to weld the strip to the honeycomb, said electrodes comprising sector shaped members, a common carrier for said members extending parallel with the strip, and means for rocking said carrier to accomplish the said movement of the electrodes relative to the strip and honeycomb.

16. In an apparatus for making welded honeycomb; a table adapted for supporting a body of honeycomb, a transfer rack adjacent the table for transferring a corrugated strip into a position of alignment with a body of honeycomb on the table, a crimping station, means for feeding a strip through said crimping station and for delivering it to said rack and for cutting off the strip on the rack to the same length as the body of honeycomb, said table being movable toward said rack to bring the body of honeycomb thereon into pressure engagement with a strip on the rack, means for clamping the strip to the body of honeycomb, a set of welding fingers adapted for entering the outermost row of cells of the body of honeycomb, means for elevating the body of honeycomb and the strip clamped thereto and the welding fingers to expose one face of the said strip, a plurality of electrodes above the transfer rack in alignment with the bottoms of the valleys of the strip, a common support for said electrodes rotatable on an axis parallel with said strip, means for moving the support to bring the electrodes into pressure engagement with said one face of the strip, and means for rocking said support while simultaneously raising the strip and body of honeycomb and fingers to accomplish the welding of the strip to the body of honeycomb.

17. In an apparatus for making welded honeycomb; a table adapted for supporting a body of honeycomb, a transfer rack adjacent the table for transferring a corrugated strip into a position of alignment with a body of honeycomb on the table, a crimping station, means for feeding a strip through said crimping station and for delivering it to said rack and for cutting off the strip on the rack to the same length as the body of honeycomb, said table being movable toward said rack to bring the body of honeycomb thereon into pressure engagement with a strip on the rack, means for clamping the strip to the body of honeycomb, a set of welding fingers adapted for entering the outermost row of cells of the body of honeycomb, means for elevating the body of honeycomb and the strip clamped thereto and the welding fingers to expose one face of the said strip, a plurality of electrodes above the transfer rack in alignment with the bottoms of the valleys of the strip, a common support for said electrodes rotatable on an axis parallel with said strip, means for moving the support to bring the electrodes into pressure engagement with said one face of the strip, and means for rocking said support while simultaneously raising the strip and body of honeycomb and fingers to accomplish the welding of the strip to the body of honeycomb, said electrodes being in the form of sectors, and each electrode being resiliently supported on the said support whereby to develop the desired pressure against the strip for the welding operation.

18. In an apparatus for making welded honeycomb; a bed, a transfer member movable horizontally on the bed for transferring a corrugated strip into a predetermined position, a table adjacent the transfer member adapted for supporting a body of honeycomb co-planar with said strip and with the face of the honeycomb parallel with the strip, a lower platen supporting the table for lateral movement parallel with the face of the honeycomb, a base on the bed supporting the said lower platen for vertical movement, said base being movable on the bed at right angles to the face of the honeycomb, a grid clamp carried by the table adapted for clamping the body of honeycomb thereto, an upper platen connected with said lower platen, a welding pin clamp member suspended beneath the upper platen for vertical reciprocation, a welding pin shuttle member suspended below said clamp member for reciprocation thereon at right angles to the face of the honeycomb, welding pins on the welding pin shuttle member adapted for entering the row of cells in the body of honeycomb next adjacent the said strip, a clamp bar resiliently suspended from the welding pin shuttle member for clamping a new strip to the face of the honeycomb, motor means for moving the base on the bed and the lower platen relative to the base, and the table on the lower platen and the grid clamp relative to the table and for moving the welding pin clamp vertically and the welding pin shuttle member thereon, and welding means for welding a strip clamped to the face of the honeycomb thereto.

19. In an apparatus for making honeycomb; crimping means comprising a pair of cylindrical meshing gear-like members adapted for receiving a strip of metal therebetween and for crimping the strip to a corrugated configuration, a transfer rack adapted for receiving the crimped strip from one of said forming members and meshing therewith, drive means interconnecting the transfer rack with said forming members, and said drive means including a drive motor.

20. In an apparatus for making honeycomb which is built-up of a plurality of corrugated strips joined together; a forming station comprising a pair of cylindrical gear-like forming members meshing with each other and adapted for receiving a strip therebetween to form the strip into the desired configuration, a chain, blocks carried by the links of the chain, said blocks being corrugated so that along the straight reaches of the chain a transfer rack is defined adapted for receiving the corrugated strips, one of said reaches meshing with one of said forming members so as to receive the said corrugated strip thereon, and means for driving said chain and forming members in unison.

21. In an apparatus for making honeycomb which is built-up of a plurality of corrugated strips joined together; a forming station comprising a pair of cylindrical gear-like forming members meshing with each other and adapted for receiving a strip therebetween to form the strip into the desired configuration, a chain, blocks carried by the links of the chain, said blocks being corrugated so that along the straight reaches of the chain a transfer rack is defined adapted for receiving the corrugated strips, one of said reaches meshing with one of said forming members so as to receive the said corrugated strip thereon, and means for driving said chain and forming members in unison, the other of said forming members which is not in mesh with said transfer rack being adjustably mounted to provide for adjustment of the space between the said forming members.

22. In an apparatus for making honeycomb which is built-up of corrugated strips connected together; a crimping station comprising a pair of meshing gear-like forming members adapted for forming strip passed therebetween to the desired corrugated configuration, a transfer rack meshing with one of said forming members adapted for receiving the strip therefrom, said rack comprising an endless chain, spaced sprockets supporting the chain so that one straight reach thereof extends past the said one forming member, corrugated blocks on the chain that mesh with the forming member, said blocks having a space therebetween along the straight reach of the chain, said spaces occurring at the valleys of the corrugations, a clamp adjacent the chain spaced from said forming member adapted for clamping the strip to a pair of blocks when the chain is halted, and a knife blade adapted for severing the strip at the valleys between said pair of blocks while the strip is so crimped.

23. In an apparatus for making honeycomb which is built-up of corrugated strips connected together; a crimping station comprising a pair of meshing gear-like forming members adapted for forming strip passed therebetween to the desired corrugated configuration, a transfer rack meshing with one of said forming members adapted for receiving the strip therefrom, said rack comprising an endless chain, spaced sprockets supporting the chain so that one straight reach thereof extends past the said one forming member, corrugated blocks on the chain that mesh with the forming member, said blocks having a space therebetween along the straight reach of the chain, said spaces occurring at the valleys of the corrugations, a clamp adjacent the chain spaced from said forming member adapted for clamping the strip to a pair of blocks when the chain is halted, and a knife blade adapted for severing the strip at the one of said valleys between said pair of blocks while the strip is so clamped, there being plungers adapted for engaging the chain for halting it in a position of operation alignment with said clamp and knive blade.

24. The combination, in a device for feeding corrugated strips in a honeycomb apparatus; of a chain having a corrugated face adapted for receiving a corrugated strip, a clamp member adapted for clamping the strip against the chain, a knife carried by the clamp member, a fluid motor connected with the clamp member for moving it toward and away from clamping position relative to the strip, said fluid motor comprising a hollow piston, a piston connected with the knife blade located within the hollow piston, and spring means urging the knive blade away from the strip whereby the clamp will first engage the strip when actuated and thereafter the knife blade and in retraction the knife will separate from the strip and thereafter the clamp will retract.

25. In a strip transfer and cut off arrangement for a honeycomb making machine; a plurality of corrugated blocks interconnected to form a transfer rack for the corrugated strip, a corrugated clamp member adjacent the rack, a piston connected with the clamp member for moving it toward and away from the said rack, said piston being bored from its end opposite the clamp, a smaller piston in the bore, a knife blade connected with the smaller piston adapted for severing the strip clamped by the clamp member, and spring means urging the smaller piston and knife away from the strip, said blocks being spaced apart about the thickness of the knife to receive the knive blade therebetween.

26. In a honeycomb making machine, a transfer member for transferring a corrugated strip into alignment with the body of honeycomb to which it is to be joined, said transfer member comprising an endless chain, blocks on the links of the chain, said blocks being corrugated for receiving the strip and forming a rack along the straight reaches of the chain, and spaced sprockets supporting the chain.

27. A transfer mechanism for a honeycomb making machine for transferring corrugated strips into alignment with the body of honeycomb to which the strip is to be attached, said transfer mechanism comprising spaced sprockets, an endless roller chain mounted on the sprockets so as to be driven thereby, and having at least one straight reach between the sprockets for conveying the corrugated strip, each link of the chain carrying a corrugated block, and the said blocks of the straight reach of the chain forming a rack member having the same pitch as the corrugated strip to be conveyed thereby.

28. A transfer mechanism for a honeycomb making machine for transferring corrugated strips into alignment with the body of honeycomb to which the strip is to be attached, said transfer mechanism comprising spaced sprockets, an endless roller chain mounted on the sprockets so as to be driven thereby, and having at least one straight reach between the sprockets for conveying the corrugated strip, each link of the chain carrying a corrugated block, and the said blocks of the said straight reach of the chain forming a rack member having the same pitch as the corrugated strip to be conveyed thereby, there being means for precisely positioning said chain in its travel, said means comprising spaced plungers adjacent the chain adapted for entering between adjacent rollers of the chain, and means for moving said plungers to and from engagement with the chain.

29. In a honeycomb making machine; a table for supporting a body of honeycomb, means for moving a strip to be joined to one face of the honeycomb into a position of spaced parallel alignment with the said face, and means for moving the table and therewith the honeycomb into engagement with the strip and for then retracting the honeycomb and strip; said means comprising fluid motor means operatively connected with said table, said fluid motor means comprising a double acting motor adapted for moving the table toward the strip and for retracting the table away from the strip, and stop means for halting the table with the honeycomb spaced from the strip during the movement of the strip into position, said stop means comprising an auxiliary piston larger than the said double acting piston adapted for engagement by the said motor when it moves the table toward the honeycomb, and means for releasing fluid from one side of the stop piston to permit the fluid motor to advance the table toward the strip.

30. In a honeycomb making machine, a table adapted for supporting a body of honeycomb, means for supporting a strip adjacent one face of the honeycomb that is to be added thereto, motor means operatively connected with the table to advance it toward the strip to bring the honeycomb into pressure engagement with the strip, said fluid motor comprising a double acting piston, a rod connecting the piston operatively with the table, a stop piston surrounding the rod and larger than the said double acting piston, said stop piston being adapted for being abutted by the rod when the honeycomb is spaced from the strip to permit the strip to be located, and means for releasing fluid from the stop piston.

31. In a honeycomb making machine, a table adapted for supporting a body of honeycomb, means for moving a corrugated strip into alignment with one face of the honeycomb, a fluid motor operatively connected with the table for advancing it toward the strip to bring the honeycomb into pressure engagement with said strip and for retracting the table together with the honeycomb and strip, and means for moving the table upwardly to welding position, said means comprising a fluid motor connected with the table, said fluid motor comprising a piston and a rod connecting the piston with the table, a stop piston surrounding the rod adapted for being abutted by the double acting piston when the table reaches welding position, and means for releasing fluid from above the stop piston at a controlled rate during the welding operation.

32. In a honeycomb making machine; a table for supporting a body of honeycomb, means for moving a corrugated strip in the direction of its length to a position parallel with and adjacent one face of a body of honeycomb on the table, means for advancing the table toward the strip to bring the honeycomb into pressure engagement therewith, means for clamping the strip to the honeycomb, means for retracting the honeycomb and the strip clamped thereto, means for elevating the table to a welding position and for engaging the exposed face of the strip by multiple electrodes, and means for then continuing elevation of the table at a controlled rate during a welding operation at which time the strip is completely welded to the body of honeycomb.

33. In a honeycomb making machine; a table for supporting a body of honeycomb, means for moving a corrugated strip in the direction of its length to a position parallel with and adjacent one face of a body of honeycomb on the table, means for advancing the table toward the strip to bring the honeycomb into pressure engagement therewith, means for clamping the strip to the honeycomb, means for retracting the honeycomb and the strip clamped thereto, means for elevating the table to a welding position and for engaging the exposed face of the strip by multiple electrodes, and means for then continuing elevation of the table at a controlled rate during a welding operation at which time the strip is completely welded to the body of honeycomb, there being fingers in the outermost row of cells of the honeycomb supporting the pressure of the electrodes, and means for shifting the fingers in unison to move the body of honeycomb on the table following the welding operation preparatory to supplying a new strip to the honeycomb.

References Cited in the file of this patent

UNITED STATES PATENTS

| | | |
|---|---|---|
| 2,747,064 | Pappelendam | May 22, 1956 |
| 2,821,616 | Spott | Jan. 28, 1958 |
| 2,843,722 | Wegeforth | July 15, 1958 |
| 2,927,991 | Schoelz | Mar. 8, 1960 |